July 22, 1969
J. E. RILEY
3,457,481
FORCE BALANCE SERVO SYSTEM IN WHICH THE RESONANT
CIRCUIT AMBIGUITY IS ELIMINATED
Filed June 27, 1966
2 Sheets-Sheet 2
FIG. 2
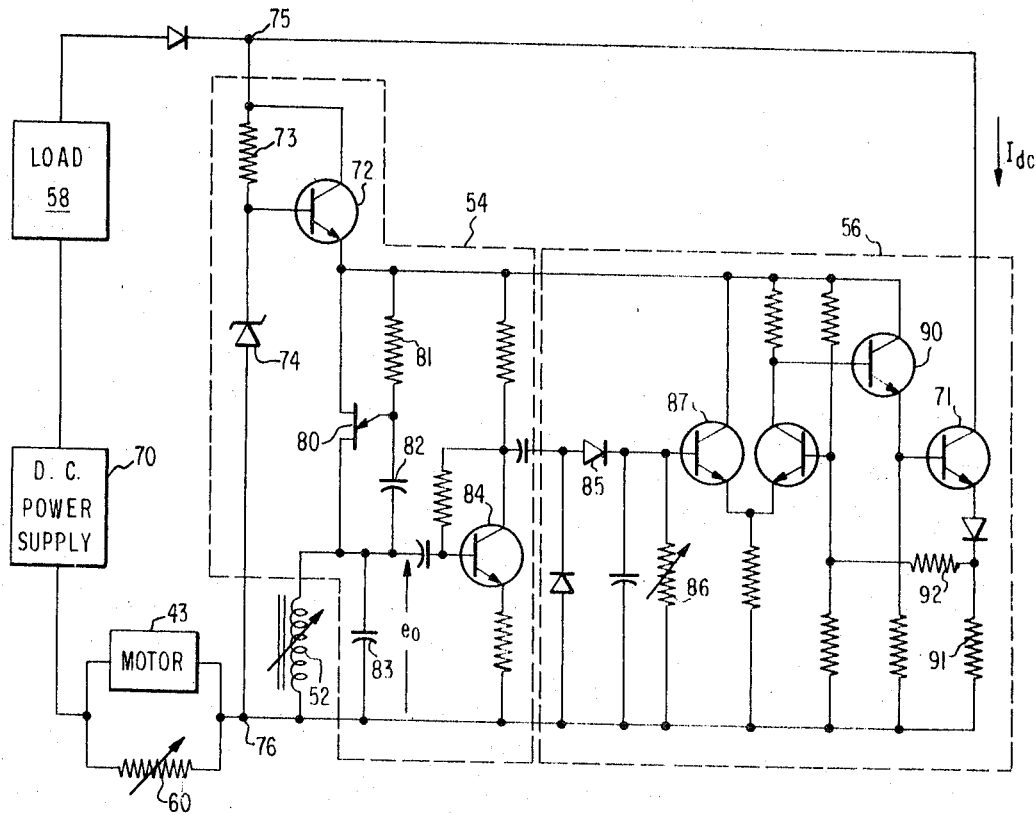
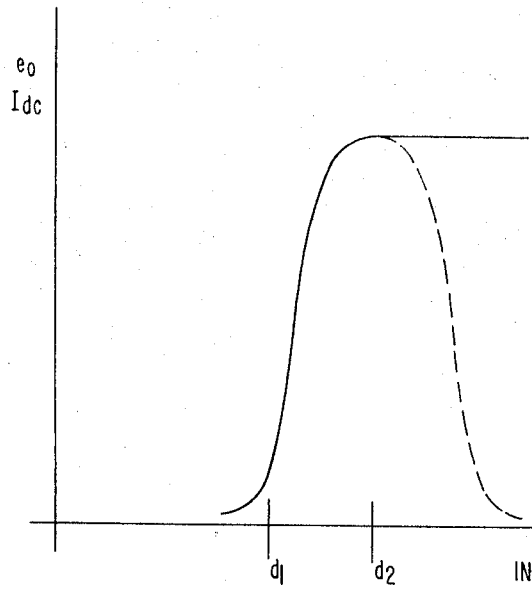
FIG. 3
INVENTOR.
JOHN E. RILEY
BY
ATTORNEY

United States Patent Office 3,457,481
Patented July 22, 1969

3,457,481
FORCE BALANCE SERVO SYSTEM IN WHICH THE RESONANT CIRCUIT AMBIGUITY IS ELIMINATED
John E. Riley, Saugus, Mass., assignor to General Electric Company, a corporation of New York
Filed June 27, 1966, Ser. No. 560,581
Int. Cl. H02p 1/46, 5/28, 7/36
U.S. Cl. 318—32        7 Claims

ABSTRACT OF THE DISCLOSURE

A position transducer. A unijunction oscillator energizes a tunable circuit which also coacts with a frequency determining capacitor. Normally the tunable circuit is energized at a frequency above its resonance range. In the normal range the tunable circuit capacitive impedance is a second order of magnitude with respect to the frequency determining capacitor impedance. When the position transducer responds to overload signals, the resonant frequency tends to exceed the energizing frequency; and this causes the unijunction oscillator frequency to vary and eliminate a signal ambiguity which would otherwise occur.

Background of the invention

This invention generally relates to signal translating means for transducers and more specifically to signal translators for producing a signal at a location remote from the transducer.

Whenever a transducer is remotely located from an associated controlling amplifier, the line capacitance introduced by the interconnecting leads between the amplifier and the transducer produces an input capacitance which is less than an acceptable input capacitance for the particular amplifier. In order to overcome this problem, a capacitor can be placed across the input to the amplifier to optimize the input impedance. As such a transducer normally includes a variable inductance coil, the capacitor placed in parallel therewith introduces a resonant circuit.

If such a resonant circuit is energized by a fixed frequency oscillator, as has been accomplished in the prior art, the voltage across the resonant circuit varies as the coil inductance changes. However, a recognized area of ambiguity exists because a given voltage across a resonant circuit can represent two inductance values except at resonance. When such systems have been used in the prior art, steps have been taken to eliminate this ambiguity. For example, fixed frequency oscillators have been chosen to operate only on one side of the resonance curve. As such resonant circuits normally have a relatively high Q, these devices must be limited to use in environments which are subjected to narrow ambient temperature variations. If a wide temperature variation is encountered, the oscillator frequency energizing the resonant circuit can shift sufficiently to cause operation on the other side of the resonance curve; the ambiguity is again involved.

It is an object of this invention to provide a transducer system in which the transducer can be located remotely from the amplifier without introducing ambiguities into the system.

Yet another object of this invention is to provide a transducer system which can be used in environments subjected to wide temperature variations without the risk of obtaining ambiguous readings.

Summary

These and other objects and advantages are obtained in one embodiment of this invention by energizing a tunable circuit at a frequency determined by a capacitor associated with an energizing means. When the frequency is greater than the resonant frequency of the tunable circuit, the tunable circuit is capacitive; however, its impedance is of second order in comparison to that of the frequency determining capacitor so the energizing frequency remains constant. However, when the resonant frequency of the tunable circuit is shifted so that it tends to become greater than the energizing frequency, the tunable circuit appears as an inductance to form a series resonant circuit with the frequency determining capacitor, and the output of the tunable circuit remains constant because the energizing frequency tracks the resonant frequency of the tunable circuit.

This invention is pointed out in the appended claims. A more thorough understanding of the above and further objects and advantages of this invention may be understood by reference to the following description taken in conjunction with the appended drawings.

Brief description of the drawings

FIGURE 2 illustrates an electrical schematic diagram of a transducer system utilizing this invention; and FIGURE 3 presents a graphical analysis of the circuit operation.

Description of an illustrative embodiment

Figure 1:
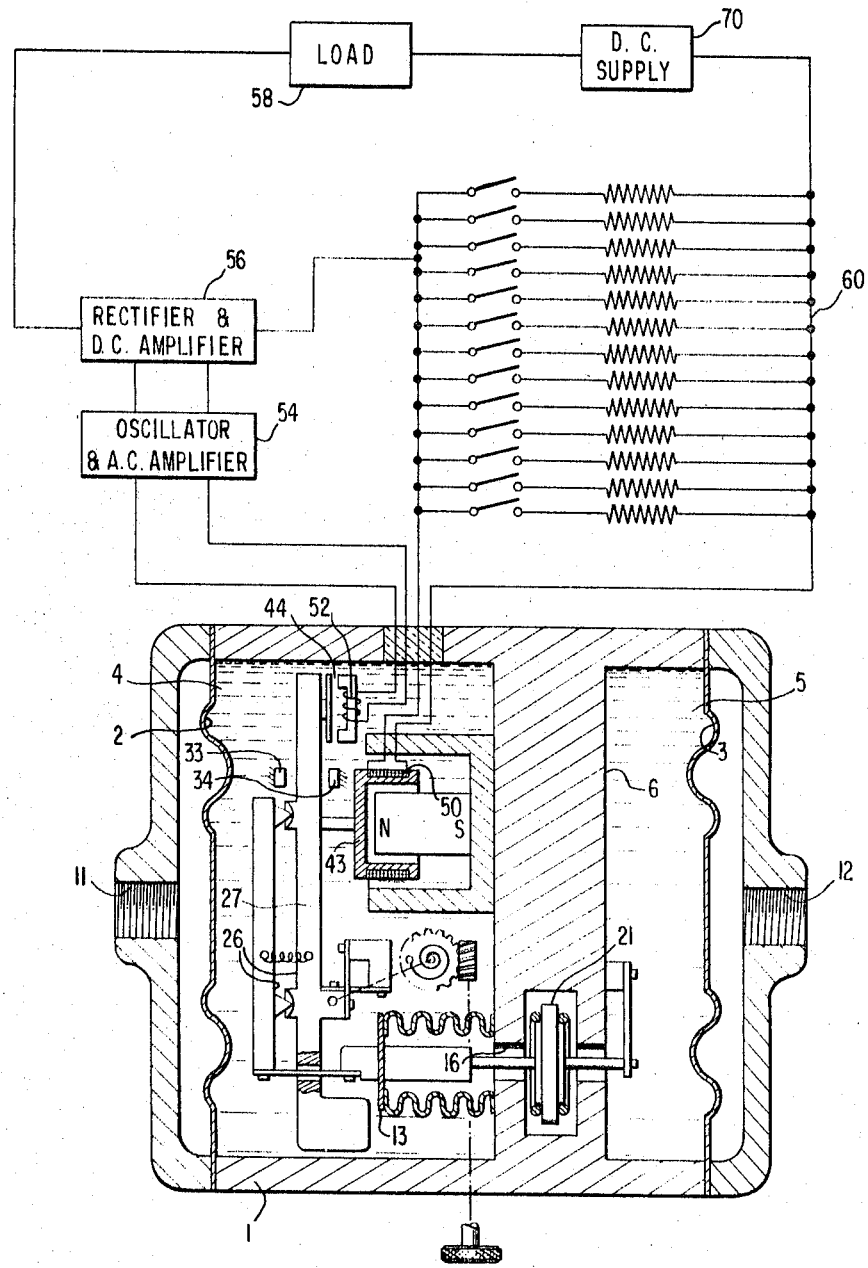
FIGURE 1 schematically illustrates a transducer system to which this invention is particularly adapted.

FIGURE 1 illustrates a pressure transducer system to which this invention is particularly adaptable and schematically shows a pressure measuring device as claimed in the application of Harold E. Trekell, Ser. No. 451,547, "Pressure Measuring Device," filed Apr. 28, 1965, now U.S. Patent 3,342,072, issued Sept. 19, 1967, and assigned to the same assignee as the present invention. In use, pressure connections 11 and 12 in the hollow casing 1 are connected to pressure lines for measuring a difference in fluid pressure in such lines. They may, for example, be pressure lines leading from the upstream and downstream of an orifice or venturi disposed in a conduit carrying process fluid, the flow of which is to be measured or controlled.

Any difference in the pressure at the pressure connections 11 and 12 is transmitted to liquid chambers 4 and 5 defined by the hollow casing 1, a rigid partition 6 and flexible isolating diaphragms 2 and 3. This difference appears across a flexible pressure sensitive element 13 which experiences a force proportional to the pressure difference. This force is applied to a lever system 26 tending to cause rotation thereof. A counterbalancing force is applied to the lever system 26 by a force motor 43, and the magnitude of the force applied is controlled by a position detector 44 to maintain the lever system in a state of balance. As the current applied to the force motor 43 is proportional to the differential pressure force exerted by the pressure sensitive element 13, it indicates the differential pressure being measured; and this current is used to actuate a load device 58 which may be a meter, recorder, or differential pressure control device. Protection of the device from over-pressure is divided by means of stops 33 and 34, the structure of the lever system 26 and a valve 21 which closes conduit 16.

The electrical circuit which interconects the position detector 44 and the force motor 43 is constituted by an oscillator and A-C amplifier circuit 54 which is energized in response to the position detector 44, and a rectifier and D-C amplifier circuit 56 which converts the signal from the oscillator and A-C amplifier circuit 54 to a control signal. This control signal determines the total current supplied from a D-C power supply 70 because the rectifier and D-C amplifier circuit 56, a pressure span selecting means 60 and the force motor coil 50 in parallel therewith and the load 58 are in series. If there is a change in the differential pressure across the pressure transducer, the lever system 26 tends to pivot and causes a change in the inductance of a position indicator coil 52 to thereby control the output of the oscillator and A-C amplifier circuit 54. Variations in the output of the oscillator and A-C amplifier circuit 54 are reflected as variations in the total direct current flowing through the rectifier and D-C amplifier circuit 56 to the force motor 43 and the pressure span selecting means 60, the change in current being such as to counteract the change produced by the variation in differential pressure.

An electrical circuit for interconnecting the position detector coil 52 and the force motor coil 50 is shown more specifically in FIGURE 2. The D-C power supply 70, the load 58 and the rectifier and D-C amplifier circuit 56 are in series with a parallel circuit constituted by the force motor 43 and the pressure span selecting means 60, shown herein as a variable resistor. The current to the force motor 43 and the pressure span selecting means 60 is controlled by a current amplifying transistor 71; and the conduction level of the current amplifying transistor 71 is determined by the inductive value of the variable inductance coil 52 associated with the position detector 44.

Power for the oscillator and A-C amplifier circuit 54 and the rectifier and D-C amplifier circuit 56 is provided by a regulated power supply comprising a transistor 72, a resistor 73 and Zener diode 74 which are connected across the amplifier terminals 75 and 76. By connecting the base of the transistor 72 so that it is clamped at a voltage determined by the Zener diode 74, the emitter voltage of the transistor 72 remains constant under wide fluxuations of load current.

The oscillator and A-C amplifier circuit 54 is thereby energized by a constant voltage and comprises a pulse generating circuit constituted by a unijunction transistor (UJT) 80 which is controlled by a standard firing circuit including a resistor 81 and a capacitor 82. The first base of UJT 80 and the capacitor 82 are connected together and to the terminal 76 by a tunable, parallel resonant circuit constituted by the detector coil 52 and another capacitor 83. Variations in the resonant frequency of this tunable circuit are determined solely by the inductive value of the coil 52.

When the oscillator and A-C amplifier circuit 54 is energized, the capacitor 82 initially determines the firing frequency of the UJT 80. If the energizing frequency is greater than the resonant frequency of the tunable circuit, the tunable circuit appears as a capacitive impedance in series with the capacitor 82 which is of such a large value that the total capacitive impedance in the first base and emitter electrodes of the UJT 80 remain substantially constant. The frequency at which the tunable circuit is energized is constant, and the voltage, $e_o$, across the capacitor 83 is a function of the inductance of the coil 52. This voltage increases with decreasing coil inductance until the resonant frequency of the tunable circuit equals the firing frequency of the UJT 80.

When a tunable circuit is energized with an energizing voltage having a frequency which is less than its resonant frequency, the tunable circuit appears as a slightly inductive impedance; and in this circuit the slightly inductive impedance appears in series with the timing capacitor 82 to form another series resonant circuit which has a higher resonant frequency than the tunable circuit. This series resonant circuit replaces the timing capacitor 82 as the effective control for the frequency of the UJT 80. Further decreases in inductance thereafter affect both the tunable circuit by increasing its resonant frequency and the UJT oscillator by increasing its firing frequency a like amount. Additional inductance decreases therefore produce no significant change in the voltage, $e_o$, across the capacitor 83 and the coil 52 because the tunable circuit is thereafter energized at its resonant frequency.

In the pressure transducer shown in FIGURE 1, the decreasing coil inductance signifies that additional current is required in the force motor coil 50. When the transducer is operating within its proper range, such a change is reflected as an increase in the amplitude of the voltage oscillations in the tunable circuit. This varying amplitude, A-C signal is coupled to an A-C amplifying transistor circuit 84 and then to a demodulating network 85 to obtain a varying D-C signal. A potentiometer 86, provides output damping of the D-C signal by varying the RC characteristics of the demodulator circuit 85. This D-C signal is then amplified for application to the current amplifier transistor 71 by being applied to one input of a differential amplifier 87, the output of which is coupled through a transistor emitter follower circuit 90 to the current amplifier transistor 71. Circuit stabilization is obtained by degeneratively feeding back a portion of an output voltage developed across a resistor 91 in series with the D-C output current to the second input of the differential amplifier 87 by means of a resistor 92.

As the circuitry from the A-C amplifier circuit 84 to the current amplifier 71 is well known in the art, detailed operational discussion for each individual circuit is not necessary. It suffices to say that an increase in the voltage across the tunable circuit constituted by the capacitor 83 and the coil 52 results in an increased conduction level for the current amplifier transistor 71. Therefore, increasing the gap of the position detector 44 causes an increased energization level for the motor coil 50 which balances the pressure change and signifies a change in differential pressure.

By utilizing the circuit shown in FIGURE 2 in a pressure transducer as shown in FIGURE 1, the output voltage for positions of the position detector 44 varies as the solid line shown in FIGURE 3. More specifically, for an increasing gap of the position detector 44 from an initial gap $d_1$, both the voltage across the tunable circuit, $e_o$, and the current $I_{dc}$, vary by increasing as the gap increases. However, beyond a gap maximum designated $d_2$, the voltage across the tunable circuit and the load current remain substantially constant.

If a fixed frequency oscillator were used, the voltage across the resonant tank, $e_o$, would vary as shown by the dashed lines in FIGURE 3; therefore, the ambiguity which could be obtained in the prior art is eliminated. Unijunction transistors can be made stable over wide temperature variations and stable capacitors and resistors are inexpensively attainable. Therefore the fixed frequency of the unijunction transistor can be made to fall within narrow limits over wide temperature ranges to provide good repeatability of the signal over a wide range of environmental temperatures.

Briefly stated, this invention provides an accurate output signal for indicating the position of a position detector which, in turn, indicates a physical condition, by energizing a tunable circuit by a pulse means which maintains a constant frequency when the tunable circuit is tuned to a frequency below that of the energizing means. As the resonant frequency of the tunable circuit tends to increase above the frequency of the energizing means, the energizing frequency becomes variable and tracks the resonant frequency of the tunable circuit.

The foregoing is a description of an illustrative embodiment of the invention, and it is the intention of the appended claims to cover all forms which fall within the scope of the invention.

What is claimed as new and desired to be secured by Letters Patent of the United States is:

1. A signal translator for producing a variable amplitude A-C signal in response to a changing condition including:
  (a) a tunable circuit, said tunable circuit exhibiting a capacitive impedance when energized at a frequency above its resonant frequency,
  (b) means for tuning said tunable circuit in response to the changing condition, (c) energizing means for producing energizing pulses and coupling said pulses to said tunable circuit, (d) a first capacitor connected to said energizing means and said tunable circuit, the energizing pulse frequency being maintained by said first capacitor at a substantially constant frequency greater than the resonant frequency of said tunable circuit during normal operation, said tunable circuit capacitive impedance being of a second order magnitude in comparison to the impedance of said first capacitor, said first capacitor and said tunable circuit coacting to vary the energizing pulse frequency when said tunable circuit resonant frequency tends to exceed the constant energizing pulse frequency, and (e) means connected to said tunable circuit for amplifying the voltage produced thereby, said voltage varying in response to said tuning means only when said tunable circuit is energized by pulses at a frequency above the tunable circuit resonant frequencies at normal operation.

2. A signal generator as recited in claim 1 wherein said tunable circuit is constituted by a second capacitor and a coil in parallel, the inductance of said coil being varied by said tuning means.

3. A signal generator as recited in claim 1 wherein said energizing means comprises:

(i) a unijunction transistor having first and second base electrodes and an emitter electrode, said first capacitor being connected to said first base and emitter electrodes, and (ii) constant voltage energizing means connected to said second base electrode and said tunable circuit, said tunable circuit being coupled to said first base electrode.

4. In a force balance transducer system including a supporting means, a lever pivoted on said supporting means, motor means operably connected to said lever, position detection means including a coil having a variable inductance, the inductance being determined by said position detector means and an amplifier for controlling the energization of said motor means, the improvement comprising:

(a) a tunable circuit comprising said coil and a first capacitor in parallel, the resonant frequency of said tunable circuit being determined by the inductance of said coil, said tunable circuit appearing as a capacitative impedance when energized at a frequency above a normal range of resonant frequencies, (b) a pulse generator for producing energizing pulses which are coupled to said tunable circuit, (c) a second capacitor connected to said pulse generator and said tunable circuit, the frequency of said energizing pulses normally being determined by said second capacitor and maintained at a substantially constant frequency above the normal range of resonant frequencies, said pulse generator circuit connected to said tunable circuit, the effect of the capacitive impedance exhibited by said tunable circuit normally being of second order in comparison with the effect of said pulse generator capacitor, said tunable circuit and said second capacitor coacting to vary the energizing pulse frequency when said tunable circuit resonant frequency tends to exceed the normal constant energizing frequency, and (d) means for coupling the alternating current voltage produced across said tunable circuit to the motor controlling amplifier.

5. The improved force balance transducer system as recited in claim 4 wherein said pulse generator comprises:

(i) a unijunction transistor having first and second base electrodes and an emitter electrode, said second capacitor being connected to said first base and emitter electrodes, and (ii) constant voltage energizing means connected to said second base electrode and said tunable circuit, said tunable circuit being coupled to said first base electrode.

6. In a force balance transducer system comprising a force balance transducer including a position detector means, a coil having a variable inductance determined by the position detector means, a motor means for balancing the transducer and an amplifier means responsive to the inductance of the coil for energizing the motor means wherein the amplifier and the transducer are to be located remotely to one another, the improvement of means for connecting the coil to the input of the amplifier including:

(a) a tunable circuit, said tunable circuit exhibiting a capacitive impedance when energized at a frequency above its resonant frequency and being constituted by said coil and a first capacitor in parallel therewith, said first capacitor being located at the amplifier location, (b) a pulse generator for producing energizing pulses which are coupled to said tunable circuit, (c) a second capacitor connected to said pulse generator, the frequency of said energizing pulses being maintained at a substantially constant frequency greater than the resonant frequencies of said tunable circuit during normal operation, said second capacitor being connected to said tunable circuit, the effect of the capacitive impedance exhibited by said tunable circuit being of second order in comparison with the effect of said second capacitor, said second capacitor and said tunable circuit coacting to vary the energizing pulse frequency when said tunable circuit resonant frequency tends to exceed the constant energizing pulse frequency, and (d) means for coupling the alternating current voltage generated in said tunable circuit to the amplifier means.

7. An improved force transducer system as recited in claim 6 wherein said pulse generator comprises:

(i) a unijunction transistor having first and second base electrodes and an emitter electrode, said second capacitor being connected to said first base and emitter electrodes, and (ii) constant voltage energizing means connected to said second base electrode and said tunable circuit, said tunable circuit being coupled to said first base electrode.

References Cited

UNITED STATES PATENTS 3,102,217   8/1963   Bullen _____ 318—28
3,222,582   12/1965   Heyman et al. ____ 318—341 X ORIS L. RADER, Primary Examiner T. E. LYNCH, Assistant Examiner U.S. Cl. X.R.

318—18, 22, 341